(12) United States Patent
Zhang et al.

(10) Patent No.: US 11,968,377 B2
(45) Date of Patent: Apr. 23, 2024

(54) UNIFIED CONSTRAINS FOR THE MERGE AFFINE MODE AND THE NON-MERGE AFFINE MODE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 174 days.

(21) Appl. No.: 17/380,278

(22) Filed: Jul. 20, 2021

(65) Prior Publication Data

US 2021/0352302 A1    Nov. 11, 2021

Related U.S. Application Data

(63) Continuation of application No. 17/099,042, filed on Nov. 16, 2020, now Pat. No. 11,197,003, which is a
(Continued)

(30) Foreign Application Priority Data

Jun. 21, 2018 (WO) ................ PCT/CN2018/092118

(51) Int. Cl.
*H04N 19/176* (2014.01)
*H04N 19/103* (2014.01)
*H04N 19/184* (2014.01)

(52) U.S. Cl.
CPC ......... *H04N 19/176* (2014.11); *H04N 19/103* (2014.11); *H04N 19/184* (2014.11)

(58) Field of Classification Search
CPC .. H04N 19/159; H04N 19/172; H04N 19/176; H04N 19/96
See application file for complete search history.

(56) References Cited

U.S. PATENT DOCUMENTS 7,529,302 B2    5/2009   Mukerjee et al.
8,184,715 B1    5/2012   Rosenzweig et al.
(Continued)

FOREIGN PATENT DOCUMENTS

CA    3025490 A1    12/2017
CA    3037685 A1    3/2018
(Continued)

OTHER PUBLICATIONS

Intention to Grant from British Patent Application No. 2018867.8 dated Nov. 11, 2022 (2 pages).
(Continued)

*Primary Examiner* — Nam D Pham
(74) *Attorney, Agent, or Firm* — Perkins Coie LLP

(57) ABSTRACT

Devices, systems and methods for sub-block based prediction are described. In a representative aspect, a method for video processing includes determining a block size constrain, making a determination, based on the block size constrain, about whether or not a merge affine mode and a non-merge affine mode are allowed for a video block in a video frame, and generating a bitstream representation of the video block based on the making the determination.

20 Claims, 10 Drawing Sheets

Related U.S. Application Data continuation of application No. PCT/IB2019/055244, filed on Jun. 21, 2019.

(56) References Cited

U.S. PATENT DOCUMENTS

| | | |
|---|---|---|
| 8,462,846 B2 | 6/2013 | Zhang |
| 9,294,777 B2 | 3/2016 | Wang |
| 9,374,595 B2 | 6/2016 | Kim et al. |
| 9,432,684 B2 | 8/2016 | Lee et al. |
| 9,521,425 B2 | 12/2016 | Chen et al. |
| 9,615,089 B2 | 4/2017 | Fartukov et al. |
| 9,667,996 B2 | 5/2017 | Chen et al. |
| 9,674,542 B2 | 6/2017 | Chen et al. |
| 9,762,927 B2 | 9/2017 | Chen et al. |
| 9,900,593 B2 | 2/2018 | Xiu et al. |
| 9,948,930 B2 | 4/2018 | Panusopone et al. |
| 9,955,186 B2 | 4/2018 | Chon et al. |
| 10,045,014 B2 | 8/2018 | Zhang et al. |
| 10,142,655 B2 | 11/2018 | Lin et al. |
| 10,298,950 B2 | 5/2019 | Wang et al. |
| 10,362,330 B1 | 7/2019 | Li et al. |
| 10,404,990 B2 | 9/2019 | Hendry et al. |
| 10,419,763 B2 | 9/2019 | Huang et al. |
| 10,440,378 B1 | 10/2019 | Xu et al. |
| 10,448,010 B2 | 10/2019 | Chen et al. |
| 10,484,686 B2 | 11/2019 | Xiu et al. |
| 10,491,902 B1 | 11/2019 | Xu et al. |
| 10,523,964 B2 | 12/2019 | Chuang et al. |
| 10,560,712 B2 | 2/2020 | Zou et al. |
| 10,701,366 B2 | 6/2020 | Chen et al. |
| 10,708,592 B2 | 7/2020 | Dong et al. |
| 10,757,417 B2 | 8/2020 | Zhang et al. |
| 10,778,999 B2 | 9/2020 | Li et al. |
| 10,779,002 B2 | 9/2020 | Chen et al. |
| 10,785,494 B2 | 9/2020 | Chien et al. |
| 10,805,630 B2 | 10/2020 | Li et al. |
| 10,841,609 B1 | 11/2020 | Liu et al. |
| 10,904,565 B2 | 1/2021 | Chuang et al. |
| 10,911,772 B2 | 2/2021 | Sato |
| 11,172,196 B2 | 11/2021 | Zhang et al. |
| 11,197,003 B2 | 12/2021 | Zhang et al. |
| 11,197,007 B2 | 12/2021 | Zhang et al. |
| 11,202,065 B2 | 12/2021 | Zhang et al. |
| 11,202,081 B2 | 12/2021 | Zhang et al. |
| 11,477,463 B2 | 10/2022 | Zhang et al. |
| 11,509,915 B2 | 11/2022 | Zhang et al. |
| 11,523,123 B2 | 12/2022 | Zhang et al. |
| 11,616,945 B2 | 3/2023 | Zhang et al. |
| 11,659,192 B2 | 5/2023 | Zhang et al. |
| 11,792,421 B2 | 10/2023 | Zhang et al. |
| 2007/0192762 A1 | 8/2007 | Eichenberger et al. |
| 2011/0002386 A1 | 1/2011 | Zhang |
| 2011/0194609 A1 | 8/2011 | Rusert et al. |
| 2011/0200107 A1 | 8/2011 | Ryu |
| 2012/0219216 A1 | 8/2012 | Sato |
| 2012/0287999 A1 | 11/2012 | Li et al. |
| 2012/0320984 A1 | 12/2012 | Zhou et al. |
| 2013/0003842 A1 | 1/2013 | Kondo |
| 2013/0101041 A1 | 4/2013 | Fishwick et al. |
| 2013/0107958 A1 | 5/2013 | Shimada et al. |
| 2013/0128976 A1 | 5/2013 | Koyama et al. |
| 2013/0182755 A1 | 7/2013 | Chen et al. |
| 2013/0229485 A1 | 9/2013 | Rusanovskyy et al. |
| 2013/0272410 A1 | 10/2013 | Seregin et al. |
| 2013/0329007 A1 | 12/2013 | Zhang et al. |
| 2014/0086325 A1 | 3/2014 | Chen et al. |
| 2014/0286408 A1 | 9/2014 | Zhang et al. |
| 2014/0286416 A1 | 9/2014 | Jeon et al. |
| 2014/0294066 A1 | 10/2014 | Kondo |
| 2014/0294078 A1 | 10/2014 | Seregin et al. |
| 2014/0334551 A1 | 11/2014 | Kim et al. |
| 2015/0023423 A1 | 1/2015 | Zhang et al. |
| 2015/0110178 A1 | 4/2015 | Kim et al. |
| 2015/0181216 A1 | 6/2015 | Zhang et al. |
| 2015/0249828 A1 | 9/2015 | Rosewarne et al. |
| 2015/0312588 A1 | 10/2015 | Yamamoto et al. |
| 2015/0373350 A1 | 12/2015 | Hendry et al. |
| 2015/0373357 A1 | 12/2015 | Pang et al. |
| 2015/0373362 A1 | 12/2015 | Pang et al. |
| 2016/0057420 A1 | 2/2016 | Pang et al. |
| 2016/0073132 A1 | 3/2016 | Zhang et al. |
| 2016/0100189 A1 | 4/2016 | Pang et al. |
| 2016/0142729 A1 | 5/2016 | Wang et al. |
| 2016/0286229 A1 | 9/2016 | Li et al. |
| 2016/0366441 A1 | 12/2016 | An et al. |
| 2016/0373756 A1 | 12/2016 | Yu et al. |
| 2017/0054996 A1 | 2/2017 | Xu et al. |
| 2017/0085905 A1 | 3/2017 | Kadono et al. |
| 2017/0142418 A1 | 5/2017 | Li et al. |
| 2017/0223378 A1 | 8/2017 | Tao et al. |
| 2017/0238005 A1 | 8/2017 | Chien et al. |
| 2017/0238011 A1 | 8/2017 | Pettersson et al. |
| 2017/0272748 A1 | 9/2017 | Seregin et al. |
| 2017/0272782 A1 | 9/2017 | Li et al. |
| 2017/0289566 A1 | 10/2017 | He et al. |
| 2017/0302929 A1 | 10/2017 | Chen et al. |
| 2017/0310990 A1 | 10/2017 | Hsu |
| 2017/0332095 A1 | 11/2017 | Zou et al. |
| 2017/0332099 A1 | 11/2017 | Lee et al. |
| 2017/0339404 A1 | 11/2017 | Panusopone et al. |
| 2017/0339405 A1 | 11/2017 | Wang et al. |
| 2018/0041762 A1 | 2/2018 | Ikai et al. |
| 2018/0048889 A1 | 2/2018 | Zhang et al. |
| 2018/0054628 A1 | 2/2018 | Pettersson et al. |
| 2018/0063553 A1 | 3/2018 | Zhang et al. |
| 2018/0098062 A1 | 4/2018 | Li et al. |
| 2018/0098087 A1* | 4/2018 | Li .................. H04N 19/159 |
| 2018/0124394 A1 | 5/2018 | Xu et al. |
| 2018/0131952 A1 | 5/2018 | Xiu et al. |
| 2018/0184117 A1 | 6/2018 | Chen et al. |
| 2018/0192069 A1 | 7/2018 | Chen et al. |
| 2018/0192072 A1 | 7/2018 | Chen et al. |
| 2018/0199056 A1 | 7/2018 | Sato |
| 2018/0220149 A1 | 8/2018 | Son et al. |
| 2018/0247396 A1 | 8/2018 | Pouli et al. |
| 2018/0249172 A1 | 8/2018 | Chen et al. |
| 2018/0270500 A1 | 9/2018 | Li et al. |
| 2018/0278951 A1 | 9/2018 | Seregin et al. |
| 2018/0288425 A1 | 10/2018 | Panusopone et al. |
| 2018/0288441 A1 | 10/2018 | Zhang et al. |
| 2018/0310017 A1 | 10/2018 | Chen et al. |
| 2018/0324454 A1 | 11/2018 | Lin et al. |
| 2018/0332298 A1 | 11/2018 | Liu et al. |
| 2018/0376166 A1 | 12/2018 | Chuang et al. |
| 2019/0020895 A1 | 1/2019 | Liu et al. |
| 2019/0037231 A1 | 1/2019 | Ikai et al. |
| 2019/0052886 A1 | 2/2019 | Chiang et al. |
| 2019/0058897 A1 | 2/2019 | Han et al. |
| 2019/0068977 A1 | 2/2019 | Zhang et al. |
| 2019/0075293 A1 | 3/2019 | Lim et al. |
| 2019/0104303 A1 | 4/2019 | Xiu et al. |
| 2019/0124332 A1 | 4/2019 | Lim et al. |
| 2019/0158866 A1 | 5/2019 | Kim |
| 2019/0182504 A1 | 6/2019 | Lainema |
| 2019/0191171 A1 | 6/2019 | Ikai et al. |
| 2019/0222859 A1 | 7/2019 | Chuang et al. |
| 2019/0246128 A1 | 8/2019 | Xu et al. |
| 2019/0246143 A1 | 8/2019 | Zhang et al. |
| 2019/0273943 A1 | 9/2019 | Zhao et al. |
| 2019/0306502 A1 | 10/2019 | Gadde et al. |
| 2019/0320181 A1 | 10/2019 | Chen et al. |
| 2019/0320189 A1 | 10/2019 | Cooper et al. |
| 2019/0335170 A1 | 10/2019 | Lee et al. |
| 2019/0342547 A1 | 11/2019 | Lee et al. |
| 2019/0364295 A1 | 11/2019 | Li et al. |
| 2019/0373259 A1 | 12/2019 | Xu et al. |
| 2019/0373261 A1 | 12/2019 | Eglimez et al. |
| 2019/0387250 A1 | 12/2019 | Boyce et al. |
| 2020/0021837 A1 | 1/2020 | Ikai et al. |
| 2020/0021839 A1 | 1/2020 | Pham Van et al. |
| 2020/0045307 A1 | 2/2020 | Jang |
| 2020/0045310 A1 | 2/2020 | Chen et al. |
| 2020/0045311 A1 | 2/2020 | Yoo |
| 2020/0053364 A1 | 2/2020 | Seo |

(56) References Cited

U.S. PATENT DOCUMENTS

| | | |
|---|---|---|
| 2020/0059658 A1 | 2/2020 | Chien et al. |
| 2020/0084441 A1 | 3/2020 | Lee et al. |
| 2020/0084454 A1 | 3/2020 | Liu et al. |
| 2020/0099951 A1 | 3/2020 | Hung et al. |
| 2020/0112741 A1 | 4/2020 | Han et al. |
| 2020/0120334 A1 | 4/2020 | Xu et al. |
| 2020/0128237 A1 | 4/2020 | Xu et al. |
| 2020/0128258 A1 | 4/2020 | Chen et al. |
| 2020/0137398 A1 | 4/2020 | Zhao et al. |
| 2020/0145688 A1 | 5/2020 | Zou et al. |
| 2020/0154127 A1 | 5/2020 | Lee |
| 2020/0169726 A1 | 5/2020 | Kim et al. |
| 2020/0177911 A1 | 6/2020 | Aono et al. |
| 2020/0213594 A1 | 7/2020 | Liu et al. |
| 2020/0213612 A1 | 7/2020 | Liu et al. |
| 2020/0213622 A1 | 7/2020 | Xu et al. |
| 2020/0221077 A1 | 7/2020 | Park et al. |
| 2020/0221110 A1 | 7/2020 | Chien et al. |
| 2020/0221120 A1 | 7/2020 | Robert et al. |
| 2020/0267408 A1 | 8/2020 | Lee et al. |
| 2020/0275120 A1 | 8/2020 | Lin et al. |
| 2020/0296380 A1 | 9/2020 | Aono et al. |
| 2020/0296382 A1 | 9/2020 | Zhao et al. |
| 2020/0296415 A1 | 9/2020 | Chen et al. |
| 2020/0336738 A1 | 10/2020 | Xiu et al. |
| 2020/0351505 A1 | 11/2020 | Seo |
| 2020/0359029 A1 | 11/2020 | Liu et al. |
| 2020/0374543 A1 | 11/2020 | Liu et al. |
| 2020/0374544 A1 | 11/2020 | Liu et al. |
| 2020/0382771 A1 | 12/2020 | Liu et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0396462 A1 | 12/2020 | Zhang et al. |
| 2020/0396465 A1 | 12/2020 | Zhang et al. |
| 2020/0404255 A1 | 12/2020 | Zhang et al. |
| 2020/0404260 A1 | 12/2020 | Zhang et al. |
| 2020/0413048 A1 | 12/2020 | Zhang et al. |
| 2021/0006780 A1 | 1/2021 | Zhang et al. |
| 2021/0006787 A1 | 1/2021 | Zhang et al. |
| 2021/0029356 A1 | 1/2021 | Zhang et al. |
| 2021/0029362 A1 | 1/2021 | Liu et al. |
| 2021/0029368 A1 | 1/2021 | Zhang et al. |
| 2021/0037240 A1 | 2/2021 | Zhang et al. |
| 2021/0037256 A1 | 2/2021 | Zhang et al. |
| 2021/0051339 A1 | 2/2021 | Liu et al. |
| 2021/0067783 A1 | 3/2021 | Liu et al. |
| 2021/0076050 A1 | 3/2021 | Zhang et al. |
| 2021/0076063 A1 | 3/2021 | Liu et al. |
| 2021/0092379 A1 | 3/2021 | Zhang et al. |
| 2021/0092435 A1 | 3/2021 | Liu et al. |
| 2021/0105482 A1 | 4/2021 | Zhang et al. |
| 2021/0152846 A1 | 5/2021 | Zhang et al. |
| 2021/0203958 A1 | 7/2021 | Zhang et al. |
| 2021/0218980 A1 | 7/2021 | Zhang et al. |
| 2021/0227234 A1 | 7/2021 | Zhang et al. |
| 2021/0392341 A1 | 12/2021 | Zhang et al. |
| 2022/0070488 A1 | 3/2022 | Chen et al. |
| 2022/0070489 A1 | 3/2022 | Zhang et al. |
| 2022/0078452 A1 | 3/2022 | Zhang et al. |
| 2022/0217363 A1 | 7/2022 | Zhang et al. |
| 2022/0264125 A1 | 8/2022 | Zhang et al. |

FOREIGN PATENT DOCUMENTS

| | | |
|---|---|---|
| CN | 1672174 A | 9/2005 |
| CN | 1710959 A | 12/2005 |
| CN | 1777283 A | 5/2006 |
| CN | 101605255 A | 12/2009 |
| CN | 101895751 A | 11/2010 |
| CN | 102577388 A | 7/2012 |
| CN | 102685479 A | 9/2012 |
| CN | 103561263 A | 2/2014 |
| CN | 104053005 A | 9/2014 |
| CN | 104170381 A | 11/2014 |
| CN | 104221376 A | 12/2014 |
| CN | 104904207 A | 9/2015 |
| CN | 105306944 A | 2/2016 |
| CN | 105532000 A | 4/2016 |
| CN | 105678808 A | 6/2016 |
| CN | 105723713 A | 6/2016 |
| CN | 105917650 A | 8/2016 |
| CN | 106303543 A | 1/2017 |
| CN | 106416245 A | 2/2017 |
| CN | 106537915 A | 3/2017 |
| CN | 106559669 A | 4/2017 |
| CN | 106688232 A | 5/2017 |
| CN | 107079161 A | 8/2017 |
| CN | 107113442 A | 8/2017 |
| CN | 107113424 A | 9/2017 |
| CN | 107211156 A | 9/2017 |
| CN | 107409225 A | 11/2017 |
| CN | 107426568 A | 12/2017 |
| CN | 107534778 A | 1/2018 |
| CN | 107615765 A | 1/2018 |
| CN | 107852490 A | 3/2018 |
| CN | 107925775 A | 4/2018 |
| CN | 107979756 A | 5/2018 |
| CN | 108012153 A | 5/2018 |
| CN | 108028929 A | 5/2018 |
| CN | 108432250 A | 8/2018 |
| CN | 108632629 A | 10/2018 |
| CN | 112020829 A | 12/2020 |
| EP | 3788782 A1 | 3/2021 |
| GB | 2539213 A | 12/2016 |
| JP | H08186825 A | 7/1996 |
| JP | 2007272733 A | 10/2007 |
| JP | 2011077761 A | 4/2011 |
| JP | 2013098745 A | 5/2013 |
| JP | 2021513818 A | 5/2021 |
| KR | 20200128154 A | 11/2020 |
| TW | 201540047 A | 10/2015 |
| TW | 201709738 A | 3/2017 |
| TW | 201832557 A | 9/2018 |
| WO | 2000065829 A1 | 11/2000 |
| WO | 2009080133 A1 | 7/2009 |
| WO | 2013168407 A1 | 11/2013 |
| WO | 2016048834 A1 | 3/2016 |
| WO | 2016057701 A1 | 4/2016 |
| WO | 2016091161 A1 | 6/2016 |
| WO | 2016138513 A1 | 9/2016 |
| WO | 2016183224 A1 | 11/2016 |
| WO | 2017130696 A1 | 3/2017 |
| WO | 2017118411 A1 | 7/2017 |
| WO | 2017133661 A1 | 8/2017 |
| WO | 2017157264 A1 | 9/2017 |
| WO | 2017157281 A1 | 9/2017 |
| WO | 2017165391 A1 | 9/2017 |
| WO | 2017188509 A1 | 11/2017 |
| WO | 2017195554 A1 | 11/2017 |
| WO | 2017197126 A1 | 11/2017 |
| WO | 2017197146 A1 | 11/2017 |
| WO | 2017206803 A1 | 12/2017 |
| WO | 2018047668 A1 | 3/2018 |
| WO | 2018066241 A1 | 4/2018 |
| WO | 2018067823 A1 | 4/2018 |
| WO | 2018097692 A2 | 5/2018 |
| WO | 2018097693 A1 | 7/2018 |
| WO | 2018184589 A1 | 10/2018 |
| WO | 2020086331 A1 | 4/2020 |

OTHER PUBLICATIONS

Examination Report from Indian Patent Application No. 202228045435 dated Dec. 26, 2022.

Non Final Office Action from U.S. Appl. No. 17/529,607 dated Oct. 31, 2022.

Non Final Office Action from U.S. Appl. No. 17/525,745 dated Nov. 10, 2022.

Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018. document JVET-L1001, 2018.

(56) References Cited

OTHER PUBLICATIONS

Zhang et al. "AHG16: Clean-up on MV Rounding," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0265, 2019.
Extended European Search Report from European Patent Application No. 19882864.2 dated Mar. 21, 2022 (9 pages).
Non Final Office Action from U.S. Appl. No. 17/019,629 dated Jun. 8, 2022.
Non-Final Office Action from U.S. Appl. No. 17/099,042 dated Dec. 31, 2020.
Advisory Action from U.S. Appl. No. 17/074,892 dated Aug. 4, 2021.
Non-Final Office Action from U.S. Appl. No. 17/071,357 dated Sep. 21, 2021.
Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.
Hsu et al. "Description of SDR Video Coding Technology Proposal by MediaTek," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0018, 2018.
Lee et al. "Unified Condition for Affine Merge and Affine Inter Mode," Joint Video Exploration Team (JVET) of ITU-T SG 16 WP 3 and ISO/IEC JTC 1/SC 29/WG 11, 5th Meeting, Geneva, CH, Jan. 12-20, 2017, JVET-E0039, 2017.
Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.
Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.
Zhang et al. "CE4: Affine Prediction with 4×4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.
Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.
Zhang et al. "Adaptive Motion Vector Resolution Rounding Align," Joint Video Experts Team (JVET) of ITU-T SG 16 WP 3 and ISO/IEC JTC 1/SC 2/WG 11, 12th Meeting, Macao, CN, Oct. 3-12, 2018, document JVET-L0377, 2018.
International Search Report and Written Opinion from PCT/CN2019/117116 dated Jan. 2, 2020 (9 pages).
International Search Report and Written Opinion from PCT/CN2019/117118 dated Feb. 5, 2020 (9 pages).
International Search Report and Written Opinion from PCT/CN2019/117119 dated Jan. 23, 2020 (9 pages).
International Search Report and Written Opinion from PCT/IB2019/055244 dated Nov. 18, 2019 (18 pages).
International Search Report and Written Opinion from PCT/IB2019/055246 dated Nov. 7, 2019 (18 pages).
International Search Report and Written Opinion from PCT/IB2019/055247 dated Nov. 7, 2019 (21 pages).
Non-Final Office Action from U.S. Appl. No. 17/071,357 dated Dec. 8, 2020.
Notice of Allowance from U.S. Appl. No. 17/071,412 dated Jan. 7, 2021.
Non-Final Office Action from U.S. Appl. No. 17/031,451 dated Dec. 4, 2020.
Notice of Allowance from U.S. Appl. No. 17/011,131 dated Dec. 10, 2020.
Non-Final Office Action from U.S. Appl. No. 17/074,842 dated Dec. 23, 2020.
Non-Final Office Action from U.S. Appl. No. 17/074,892 dated Dec. 24, 2020.
Non-Final Office Action from U.S. Appl. No. 17/005,521 dated Jan. 7, 2021.
Final Office Action from U.S. Appl. No. 17/019,629 dated Feb. 26, 2021.
Final Office Action from U.S. Appl. No. 17/005,521 dated Apr. 26, 2021.
Non-Final Office Action from U.S. Appl. No. 17/161,391 dated Mar. 25, 2021.
Final Office Action from U.S. Appl. No. 17/161,391 dated Jul. 14, 2021.
Han et al. "A Dynamic Motion Vector Referencing Scheme for Video Coding," 2016 IEEE International Conference on Image Processing (ICIP), 2016, pp. 2032-2036.
Koyama et al. "Modification of Derivation Process of Motion Vector Information for Interlace Format," Joint Collaborative Team on Video Coding (JCT-VC) of ITU-T SG16 WP3 and ISO/IEC JTC1/SC29/WG11 7th Meeting: Geneva, CH, Nov. 21-30, 2011, document JCTVC-G196, 2011.
Shimada et al. "Non-CE9/Non-CE13: Averaged Merge Candidate," Joint Collaborative Team on Video Coding (JCT-VC)of ITU-T SG16 WP3 and ISO/IEC JTC1/SC29/WG11 7th Meeting: Geneva, CH, Nov. 21-30, 2011, document JCTVC-G195, 2011.
Non Final Office Action from U.S. Appl. No. 17/210,797 dated Aug. 2, 2022.
Alshin et al. "Bi-Directional Optical Flow for Improving Motion Compensation," 28th Picture Coding Symposium, PCS2010, Dec. 8, 2010, Nagoya, Japan, pp. 422-425.
Bross et al. "Versatlie Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.
Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.
Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0025, 2018.
Chen et al. "DMVR Extension baed on Template Matching," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0057, 2018.
Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.
JEM-7.0: https://jvet.hhi.fraunhofer.de/svn/svn_HMJEMSoftware/tags/ HM-16.6-JEM-7.0. (only website).

(56) References Cited

OTHER PUBLICATIONS

Han et al. "CE4-Related: Modification on Merge List," Joint Video Exploration Team (JVET) of ITU-T SG 16 WP 3 and ISO/IEC JTC 1/SC 29/WG 11, 13th Meeting, Marrakech, MA, Jan. 9-18, 2019, document JVET-M0127, 2019.
He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.
"High Efficiency Video Coding" Series H: Audiovisual and Multimedia Systems: Infrastructure of Audiovisual Services—Coding of Moving Video, ITU-T, H.265, 2018.
Hsiao et al. "CE4.2.8: Merge Mode Enhancement," Joint Video Experts Team (JVET of ITU-T SG 16 WP 3 and ISO/IEC JTC 1/SC 29/WG 11, 11th Meeting: Ljubljana, SI, Jul. 10-18, 2018, document JVET-K0245, 2018.
H.265/HEVC, https://www.itu.int/rec/T-REC-H.265.
Li et al. "Affine Deformation Model Based Intra Block Copy for Intra Frame Coding," 2020, Institute of Information and Communication Engineering, Zhejiang University.
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Li et al. "Non-CE4: Harmonization between HMVP and Gbi," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.
Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.
Li et al. "Combining Directional Intra Prediction and Intra Block Copy with Block Partitioning for HEVC," 2016 IEEE International Conference on Image Processing (ICIP), Phoenix, Az, USA, 2016, pp. 524-528.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.
Sullivan et al. "Overview of the High Efficiency Video Coding (HEVC) Standard," IEEE Transactions on Circuits and Systems for Video Technology, Dec. 2012, 22(12):1649-1668.
Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R_Notes_d, 2014.
Toma et al. "Description of SDR Video Coding Technology Proposal by Panasonic," Joint Video Experts Team (JVET) of ITU-T SG 16 WP 3 and ISO/IEC JTC 1/SC 29/WG 11, 10th Meetingmm San Diego, US, Apr. 10-20, 2018, document JVET-J0020, 2018.
Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018. document JVET-J1023, 2018.
Xu et al. "Intra Block Copy in HEVC Screen Content Coding Extensions," IEEE Journal on Emerging and Selected Topics in Circuits and Systems, Dec. 2016, 6(4):409-419.
Xu et al. "CE8-Related Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843, 2019.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.
Zhang et al. "Rotate Intra Block Copy for Still Image Coding," 2015 IEEE International Conference on Image Processing (ICIP), IEEE, Sep. 27, 2015, pp. 4102-4106.
Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, 10-18 (Jul. 2018), Document JVET-K0104, 2018.
Zhang et al. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.
Zhang et al. "BoG Report on CE4 Related Contributions," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0843, 2019.
Zhang et al. "On Adaptive Motion Vector Resolution," Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, document JCTVC-T0059, 2015.
Zou et al. "Improved Affine Motion Prediction," Joint Video Exploration Team (JVET) of ITU-T SG 16 WP3 and ISO/IEC JTC 1/SC 29/WG 11, 3rd Meeting, Geneva, CH, May 26-Jun. 1, 2016, document JVET-C0062, 2016.
Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0532, and JVET-K0161, 2018.
International Search Report and Written Opinion from PCT/IB2019/054602 dated Aug. 21, 2019 (17 pages).
International Search Report and Written Opinion from PCT/IB2019/054604 dated Sep. 26, 2019 (17 pages).
International Search Report and Written Opinion from PCT/IB2019/054611 dated Aug. 29, 2019 (88 pages).
International Search Report and Written Opinion from PCT/IB2019/054612 dated Sep. 26, 2019 (17 pages).
International Search Report and Written Opinion from PCT/IB2019/054614 dated Aug. 27, 2019 (14 pages).
International Search Report and Written Opinion from PCT/IB2019/054650 dated Oct. 28, 2019 (20 pages).
International Search Report and Written Opinion from PCT/IB2019/054652 dated Sep. 27, 2019 (18 pages).
International Search Report and Written Opinion from PCT/IB2019/054654 dated Aug. 27, 2019 (85 pages).
International Search Report and Written Opinion from PCT/IB2019/058078 dated Mar. 3, 2020(20 pages).
International Search Report and Written Opinion from PCT/IB2019/058079 dated Mar. 3, 2020(26 pages).
International Search Report and Written Opinion from PCT/IB2019/058081 dated Mar. 25, 2020(21 pages).
Non-Final Office Action from U.S. Appl. No. 17/019,629 dated Nov. 13, 2020.
Non-Final Office Action from U.S. Appl. No. 17/011,157 dated Nov. 17, 2020.
Huang, Wanzhang, "Research on Side Information Generation of Distributed Video Coding," South China University of Technology, Guangzhou, China, 2012.
Jang et al. "Non-CE8: Modification on SbTMVP Process Regarding with CPR," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0335, 2019.
Lai et al. "CE8-Related: Clarification on Interaction Between CPR and other Inter Coding Tools," Joint Video Experts Teram (JVET) of ITU-T SG 16 WP 3 and ISO/IEC JTC 1/SC 29/WG 11, 13th Meeting, Marrakech, MA, Jan. 9-18, 2019, document JVET-M0175, 2019.

(56) References Cited

OTHER PUBLICATIONS

Solovyev et al. "Non-CE4: Merge Mode Modification," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0056, 2018.

Xu et al. "Non-CE8: Mismatch Between Text Specification and Reference Software on ATMVP Candidate Derivation When CPR is Enabled," Joint Video Experts Team (JVET) of ITU-T SG 16 WP 3 and ISO/IEC JTC 29/WG 11, 13th Meeting, Marrakech, MA, Jan. 9-18, 2019, document JVET-M0409, 2019.

Yang et al. "BoG Report on CE4 Related Contributions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0546, 2018.

Zhao et al. "Intra Mini-Block Copy Algorithm for Screen Content Coding," Journal of Computer Applications, 2016, 36(7): 1938-1943.

Zuo et al. "Intra Block Copy for Intra-Frame Coding," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0042, 2018.

Final Office Action from U.S. Appl. No. 17/031,451 dated Dec. 21, 2021.

Notice of Allowance n from U.S. Appl. No. 17/071,357 dated Feb. 2, 2022.

Office Action from Indian Patent Application No. 202127002718 dated Jan. 6, 2022.

Notice of Allowance from U.S. Appl. No. 17/525,745 dated May 30, 2023.

Non Final Office Action from U.S. Appl. No. 17/412,771 dated Feb. 16, 2023.

Non Final Office Action from U.S. Appl. No. 17/732,849 dated Mar. 2, 2023.

Final Office Action from U.S. Appl. No. 17/529,607 dated Apr. 17, 2023.

Notice of Allowance from U.S. Appl. No. 17/732,849 dated Sep. 22, 2023.

Final Office Action from U.S. Appl. No. 17/732,849 dated Jun. 16, 2023.

\* cited by examiner

UNIFIED CONSTRAINS FOR THE MERGE AFFINE MODE AND THE NON-MERGE AFFINE MODE

CROSS REFERENCE TO RELATED APPLICATIONS

This application is a continuation of U.S. application Ser. No. 17/099,042, filed on Nov. 16, 2020, which is a continuation of International Application No. PCT/IB2019/055244, filed on Jun. 21, 2019, which claims the priority to and benefits of International Patent Application No. PCT/CN2018/092118, filed on Jun. 21, 2018. All the aforementioned patent applications are hereby incorporated by reference in their entireties.

TECHNICAL FIELD

This patent document is directed generally to image and video coding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems and methods related to sub-block based prediction for image and video coding are described.

In a representative aspect, the disclosed technology may be used to provide a method for video processing. This method includes determining a block size constrain, making a determination, based on the block size constrain, about whether or not a merge affine mode and a non-merge affine mode are allowed for a video block in a video frame, and generating a bitstream representation of the video block based on the making the determination.

In a representative aspect, the disclosed technology may be used to provide another method for video processing. This method includes determining a block size constrain, making a determination, based on the block size constrain, about whether or not a merge affine mode and a non-merge affine mode are allowed for a video block in a video frame, and generating the video block from a bitstream representation of the video block based on the making the determination.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Figure 1:
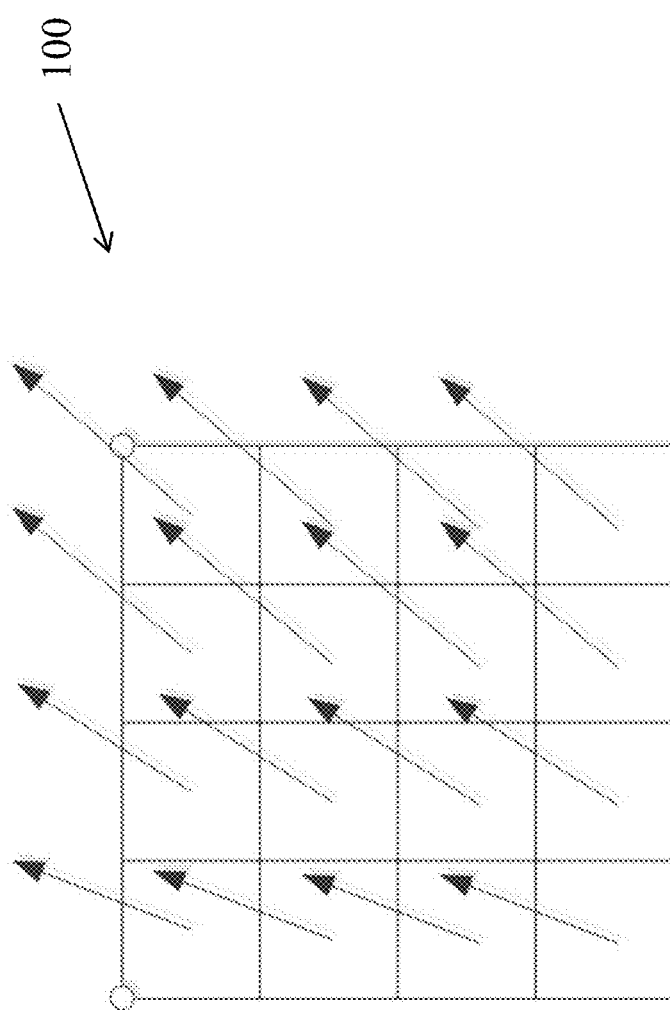
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

1.1 Examples of Affine Prediction

Figure 2:
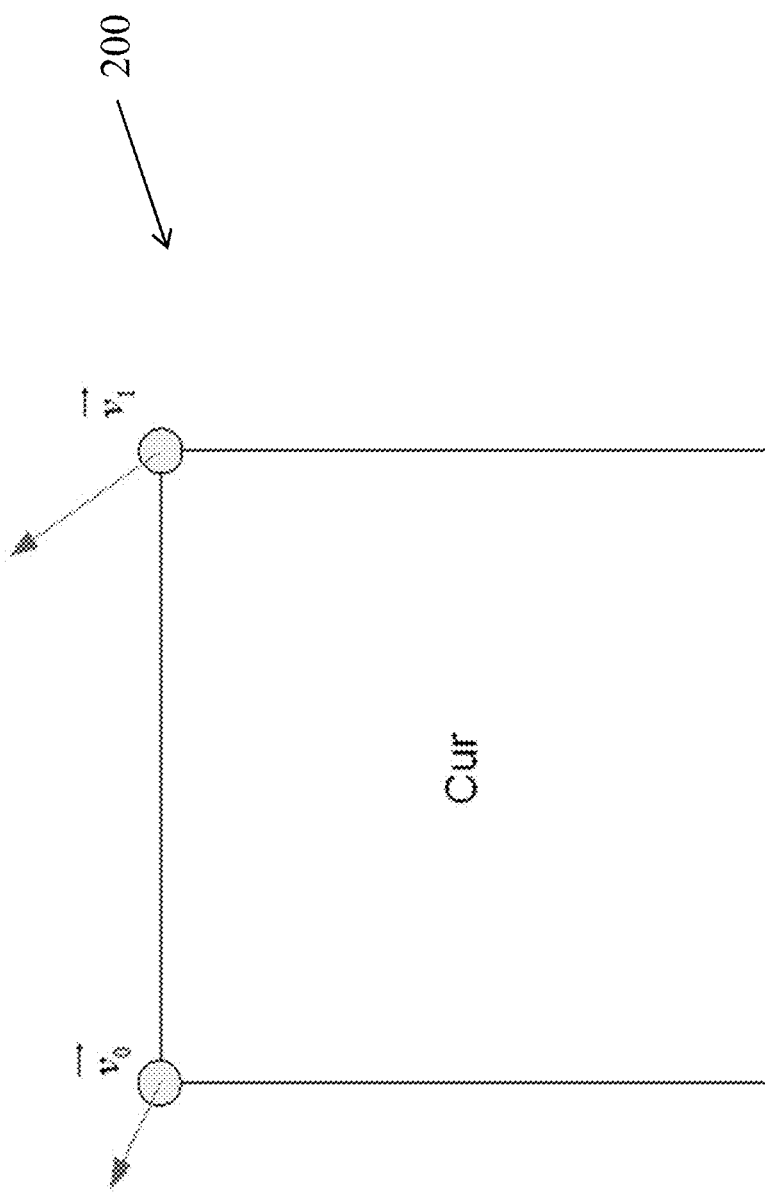
FIG. 2 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{Eq. (1)}$$

As shown in FIG. 2, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = clip3\left(4, w, \dfrac{w \times MvPre}{\max(abs(v_{1x} - v_{0x}), abs(v_{1y} - v_{0y}))}\right) \\ N = clip3\left(4, h, \dfrac{h \times MvPre}{\max(abs(v_{2x} - v_{0x}), abs(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 3:
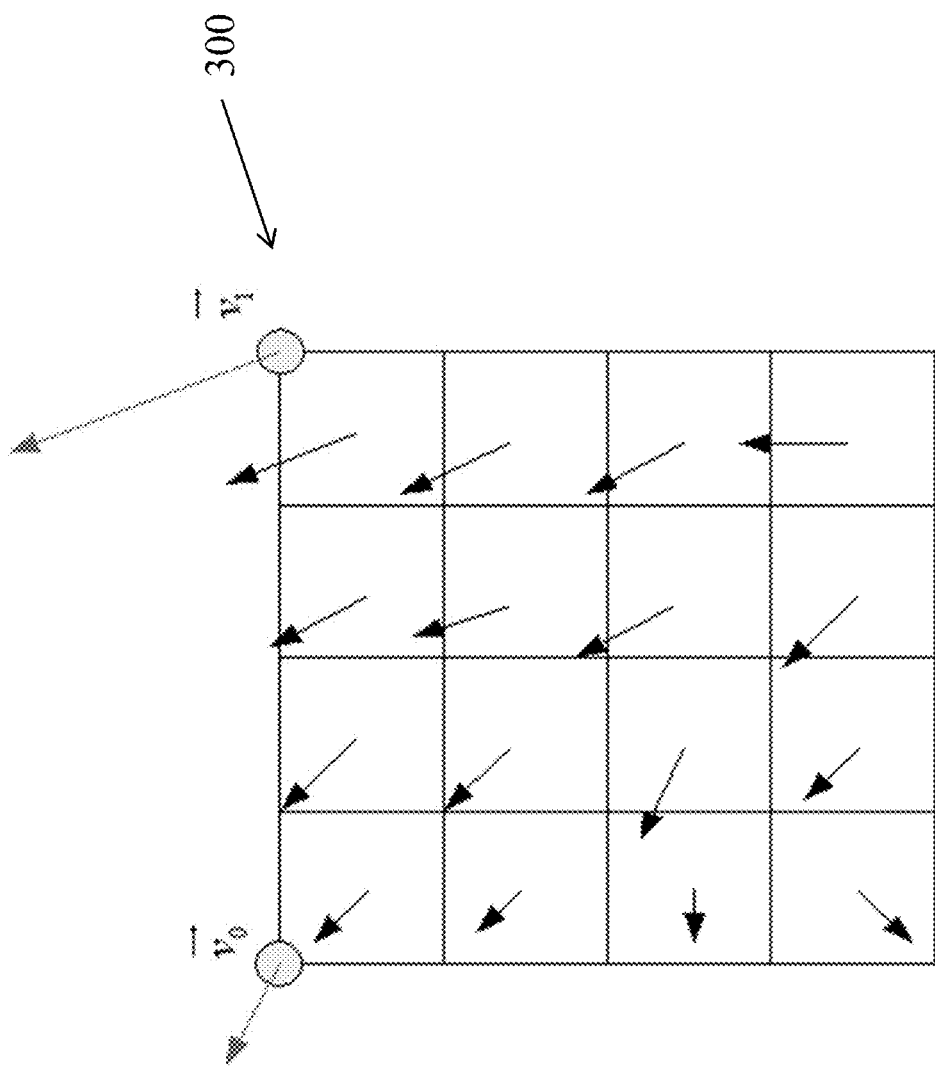
FIG. 3 shows an example of an affine motion vector field (MVF) per sub-block.

FIG. 3 shows an example of affine MVF per sub-block for a block 300. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1) | v_0 = \{V_A, V_B, V_C\}, v_1 = \{v_D, v_E\}\}$ is constructed using the neighboring blocks.

Figure 4:
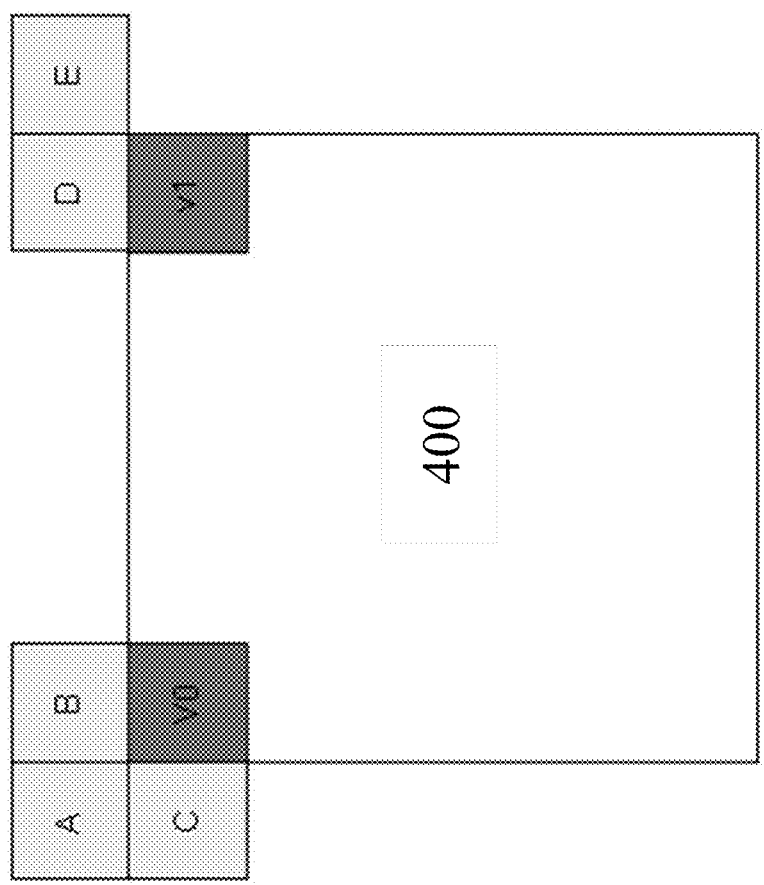
FIG. 4 shows an example of motion vector prediction (MVP) for the AF_INTER affine motion mode.

FIG. 4 shows an example of motion vector prediction (MVP) for a block 400 in the AF_INTER mode. As shown in FIG. 4, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the advanced motion vector prediction (AMVP) candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

Figure 5B:
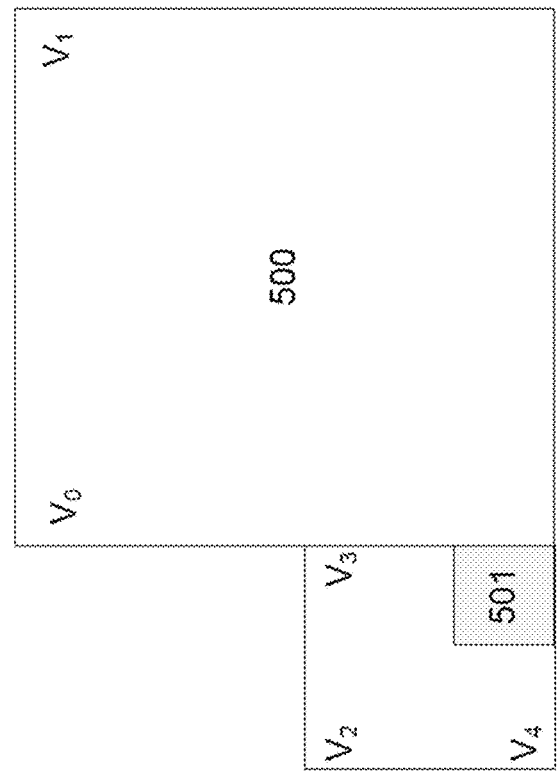
FIGS. 5A and 5B show example candidates for the AF_MERGE affine motion mode.
Figure 5A:
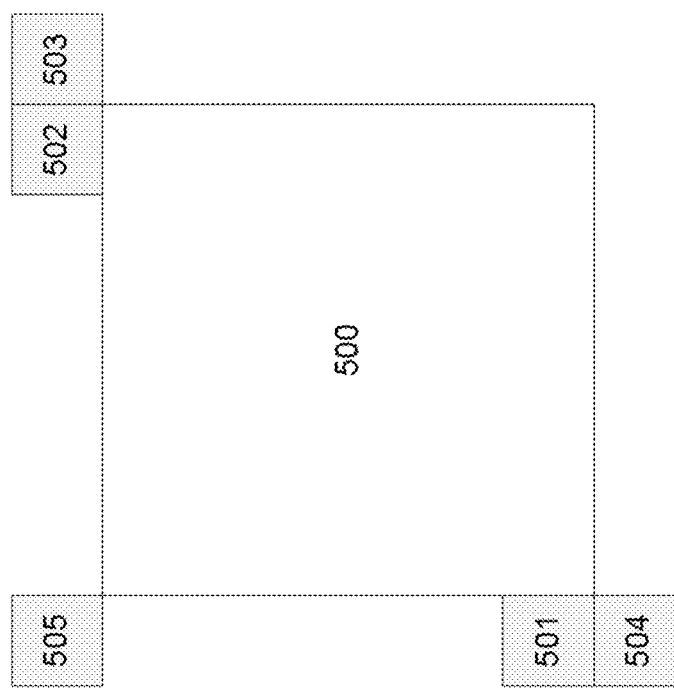

When a CU is applied in AF_MERGE mode, it gets the first block coded with an affine mode from the valid neighboring reconstructed blocks. FIG. 5A shows an example of the selection order of candidate blocks for a current CU 500. As shown in FIG. 5A, the selection order can be from left (501), above (502), above right (503), left bottom (504) to above left (505) of the current CU 500. FIG. 5B shows another example of candidate blocks for a current CU 500 in the AF_MERGE mode. If the neighboring left bottom block 501 is coded in affine mode, as shown in FIG. 5B, the motion vectors $v_2$, $v_3$ and $v_4$ of the top left corner, above right corner, and left bottom corner of the CU containing the sub-block 501 are derived. The motion vector $v_0$ of the top left corner on the current CU 500 is calculated based on $v_2$, $v_3$ and $v_4$. The motion vector $v_1$ of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

In JEM, the non-merge affine mode can be used only when the width and the height of the current block are both larger than 8; the merge affine mode can be used only when the area (i.e. width×height) of the current block is not smaller than 64.

2. Examples of Existing Methods for Sub-Block Based Implementation

Figure 6:
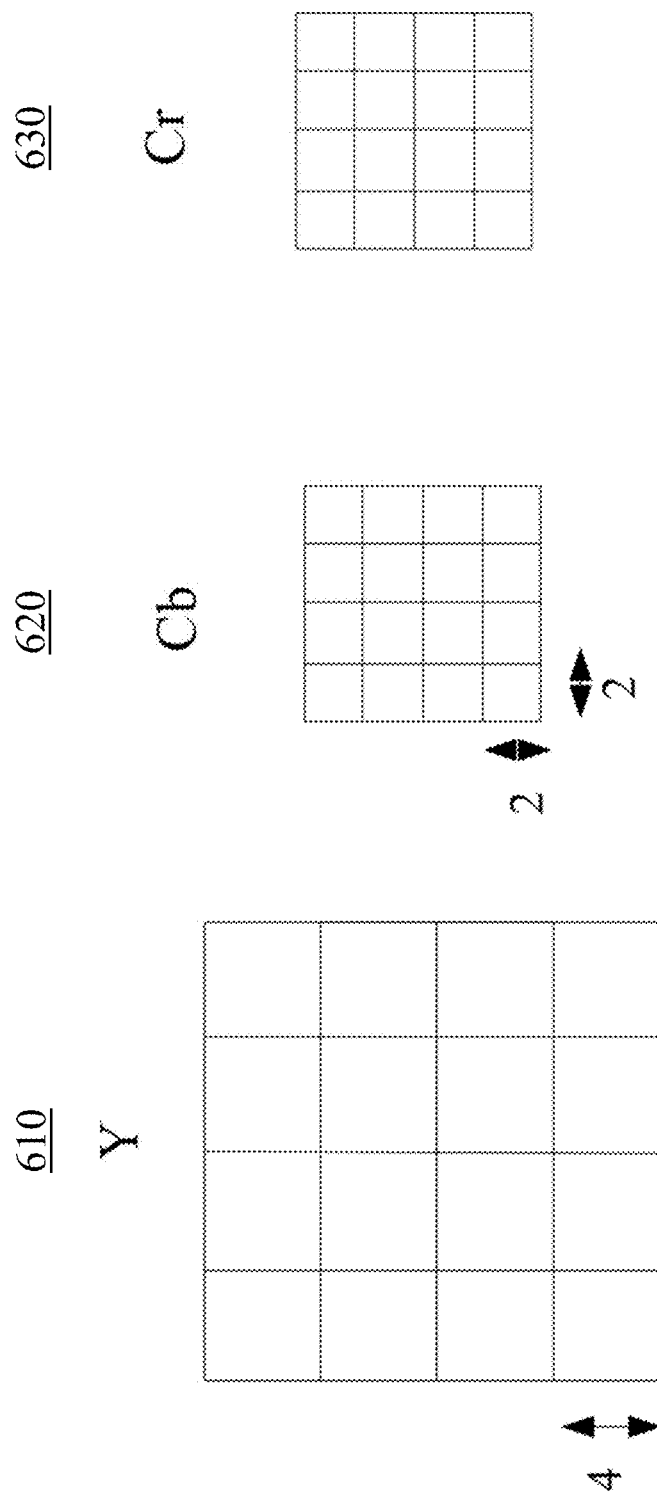
FIG. 6 shows an example of sub-blocks for different components with the 4:2:0 format in JEM.

In some existing implementations, the size of sub-blocks (such as 4×4 in JEM) is primarily designed for the luma component. For example, in JEM, the size of sub-blocks is for the 2×2 chroma components with the 4:2:0 format, and for the 2×4 chroma components with the 4:2:2 format. The small size of sub-blocks imposes a higher band-width requirement. FIG. 6 shows an example of sub-blocks of a 16×16 block (8×8 for Cb/Cr) for different components with the 4:2:0 format in JEM.

In other existing implementations, in some sub-block based tools such as the affine prediction in JEM, MVs of each sub-block are calculated with the affine model as shown in Eq. (1) independently for each component, which may result in misalignment of motion vectors between luma and chroma components.

In yet other existing implementations, in some sub-block based tools such as affine prediction, the usage constrains are different for the merge mode and the non-merge inter mode (a.k.a. AMVP mode, or normal inter-mode), which need to be unified.

3. Exemplary Methods for Sub-Block Based Prediction in Video Coding

Sub-block based prediction methods include unifying the constraints for the merge affine mode and the non-merge affine mode. The use of sub-block based prediction to improve video coding efficiency and enhance both existing and future video coding standards is elucidated in the following examples described for various implementations.

Example 1. The merge affine mode and the non-merge affine mode are allowed or disallowed with the same block size constraint.

(a) The block size constrain depends on the width and height compared to one or two thresholds. For example, both the Merge affine mode and the non-merge affine mode are allowed if the width and the height of the current block are both larger than M (e.g., M equal to 8), or width is larger than M0 and height is larger than M1 (e.g., M0 equal to 8 and M1 equal to 4); otherwise, both the Merge affine mode and the non-merge affine mode are not allowed. In another example, both the Merge affine mode and the non-merge affine mode are allowed if the width and the height of the current block are both larger than M (e.g., M equal to 16); otherwise, both the Merge affine mode and the non-merge affine mode are not allowed.

(b) The block size constrain depends on the total number of samples within one block (i.e., the area width× height). In one example, both the Merge affine mode and the non-merge affine mode are allowed if the area (i.e. width×height) of the current block is not smaller than N (e.g., N equal to 64); Otherwise, both the Merge affine mode and the non-merge affine mode are not allowed.

(c) For the merge affine mode, it can be an explicit mode with signaling a flag as in JEM, or it can be an implicit mode without signaling a flag as in other implementations. In the latter case, the affine merge candidate is not put into the unified merge candidate list if the merge affine mode is not allowed.

(d) For the non-merge affine mode, when affine is disallowed according to above rules, the signaling of indications of affine mode is skipped.

The examples described above may be incorporated in the context of the methods described below, e.g., methods 700 and 750, which may be implemented at a video encoder and video decoder, respectively.

Figure 7A:
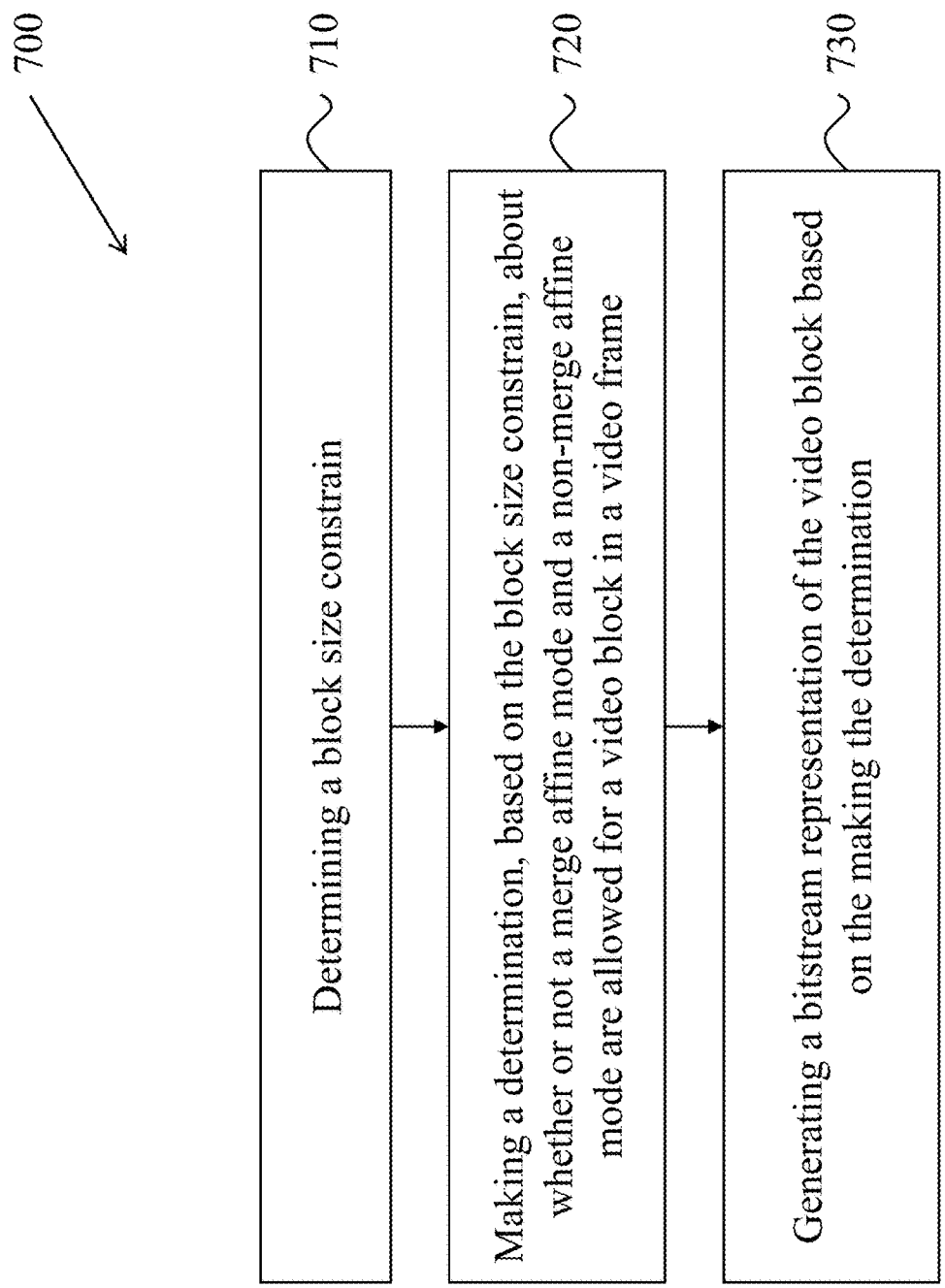
FIG. 7A shows a flowchart of an example method for video processing.

FIG. 7A shows a flowchart of an exemplary method for video processing. The method 700 includes, at operation 710, determining a block size constrain of a video block in a video frame. At operation 720, making a determination, based on the block size constrain, about whether or not a merge affine mode and a non-merge affine mode are allowed for the video block. At operation 730, generating a bitstream representation of the video block based on the making the determination.

In some embodiments, the generating the bitstream representation includes coding the video block using the merge affine mode by including an indication of the merge affine mode in the bitstream representation. In some embodiments, the generating the bitstream representation includes coding the video block using the non-merge affine mode by including an indication of the non-merge affine mode in the bitstream representation. In some embodiments, the generating the bitstream representation includes coding the video block using the merge affine mode by omitting an indication of the merge affine mode in the bitstream representation, thereby implicitly indicating the merge affine mode. In some embodiments, the generating the bitstream representation includes coding the video block using the non-merge affine mode by omitting an indication of the non-merge affine mode in the bitstream representation, thereby implicitly indicating the non-merge affine mode.

In some embodiments, the generating the bitstream representation includes generating the bitstream representation from the video block such that the bitstream omits an explicit indication of the merge affine mode due to the determination that the block size constrain disallowed the merge affine mode. In some embodiments, the generating the bitstream representation includes generating the bitstream representation from the video block such that the bitstream omits an explicit indication of the non-merge affine mode due to the determination that the block size constrain disallowed the non-merge affine mode. In some embodiments, the block size constrain of the video block includes a height of the video block and a width of the video block that are each greater than a common threshold. In some embodiments, the common threshold is eight, and the merge affine mode and the non-merge affine mode are allowed in response to the height of the video block and the width of the video block being greater than the common threshold. In some embodiments, the common threshold is sixteen, and the merge affine mode and the non-merge affine mode are allowed in response to the height of the video block and the width of the video block being greater than the common threshold.

In some embodiments, the block size constrain of the video block includes a height of the video block greater than a first threshold and a width of the video block greater than a second threshold, and the first threshold and the second threshold are different. In some embodiments, the block size constrain of the video block includes a height of the video block and a width of the video block, and a product of the height and the width is greater than a threshold.

Figure 7B:
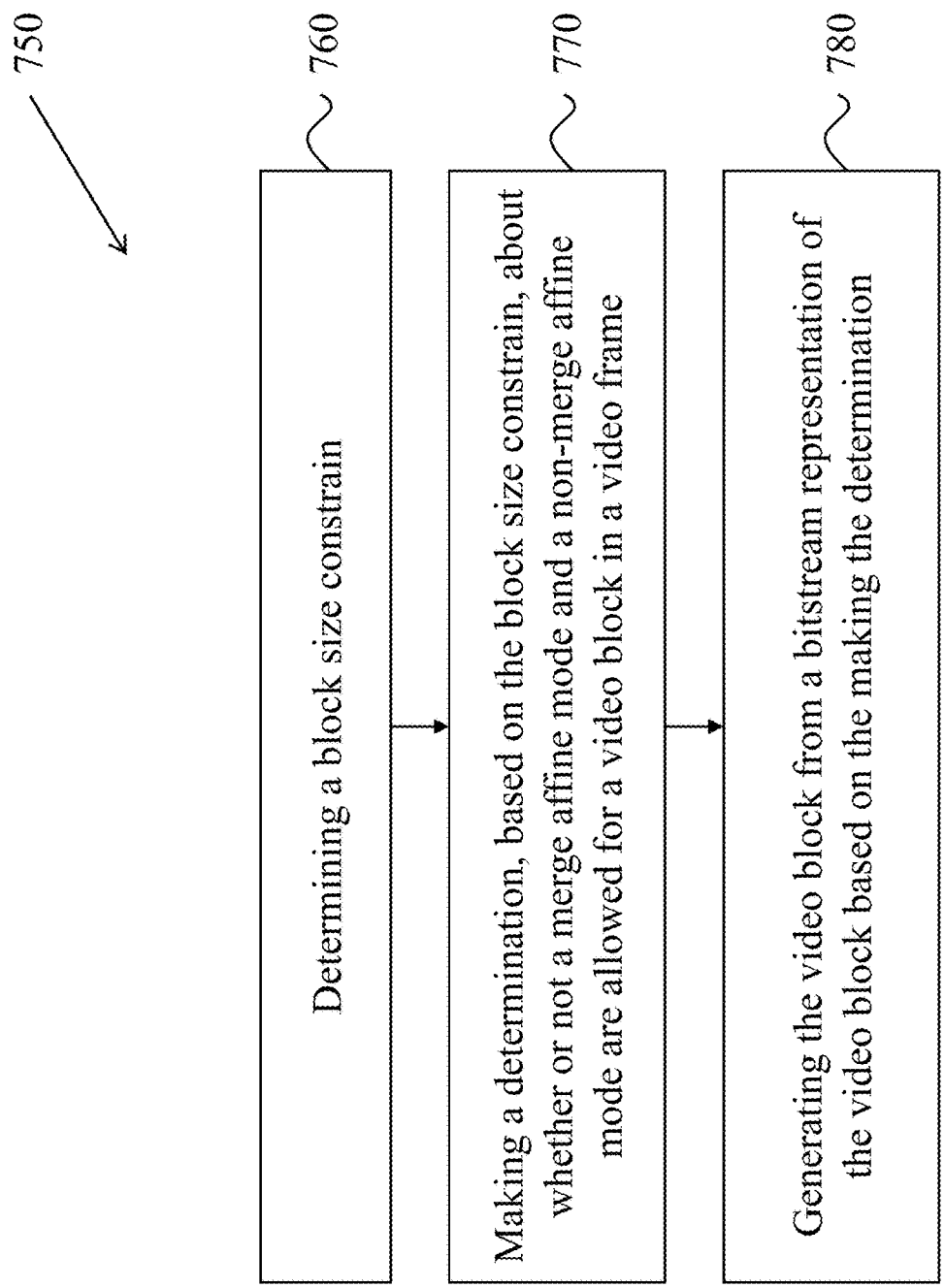
FIG. 7B shows another flowchart of an example method for video processing.

FIG. 7B shows another flowchart of an exemplary method for motion compensation. The method 750 includes, at operation 760, determining a block size constrain of a video block in a video frame. At operation 770, making a determination, based on the block size constrain, about whether or not a merge affine mode and a non-merge affine mode are allowed for the video block. At operation 780, generating the video block from a bitstream representation of the video block based on the making the determination.

In some embodiments, the bitstream representation includes an indication of the merge affine mode, and the video block is generated using the merge affine mode by parsing the bitstream representation according to the indication. In some embodiments, the bitstream representation includes an indication of the non-merge affine mode, and the video block is generated using the non-merge affine mode by parsing the bitstream representation according to the indication. In some embodiments, the bitstream representation omits an indication of the merge affine mode, and wherein the video block is generated using the merge affine mode by parsing the bitstream representation in absence of the indication of the merge affine mode. In some embodiments, the bitstream representation omits an indication of the non-merge affine mode, and the video block is generated using the non-merge affine mode by parsing the bitstream representation in absence of the indication of the non-merge affine mode.

In some embodiments, the block size constrain of the video block includes a height of the video block and a width of the video block that are each greater than a common threshold. In some embodiments, the block size constrain of the video block includes a height of the video block greater than a first threshold and a width of the video block greater than a second threshold, and the first threshold and the second threshold are different. In some embodiments, the block size constrain of the video block includes a height of the video block and a width of the video block, and a product of the height and the width is greater than a threshold.

The methods 700 and 750, described respectively in the context of FIGS. 7A and 7B, may further include processing the block of video data based on a motion compensation algorithm. In some embodiments, the motion compensation algorithm may be affine motion compensation prediction, alternative temporal motion vector prediction (ATMVP), spatial-temporal motion vector prediction (STMVP), pattern matched motion vector derivation (PMMVD), bi-directional optical flow (BIO) or decoder-side motion vector refinement (DMVR).

In a representative aspect, the above-described methods 700 and/or 750 are embodied in the form of processor-executable code and stored in a computer-readable program medium. In yet another representative aspect, a device that is configured or operable to perform the above-described methods are disclosed. The device may include a processor that is programmed to implement the above described methods 700 and/or 750. In yet another representative aspect, a video encoder apparatus may implement method 700. In yet another representative aspect, a video decoder apparatus may implement method 750.

4. Example Implementations of the Disclosed Technology

Figure 8:
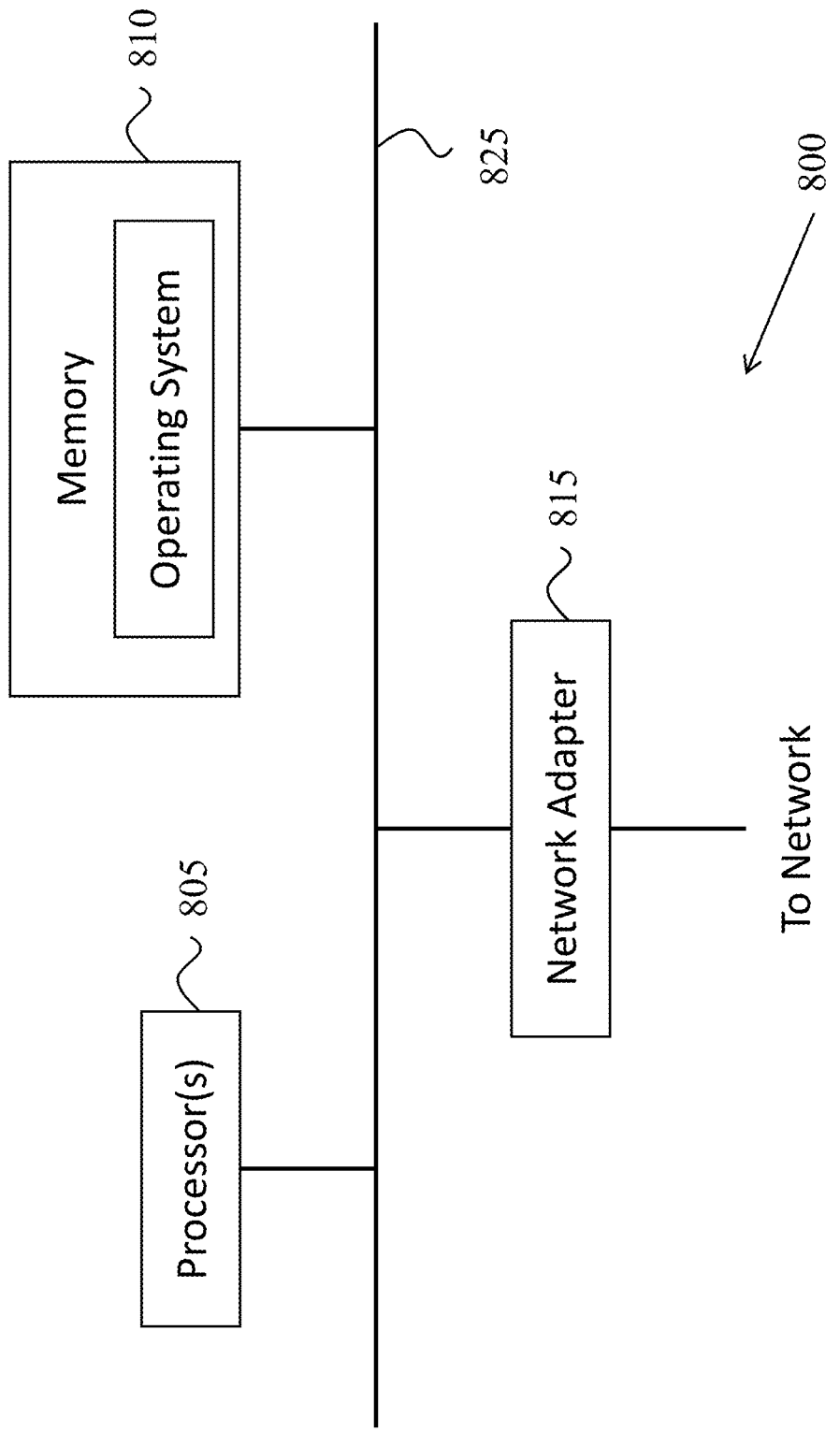
FIG. 8 is a block diagram illustrating an example of the architecture for a computer system or other control device that can be utilized to implement various portions of the presently disclosed technology.

FIG. 8 is a block diagram illustrating an example of the architecture for a computer system or other control device that can be utilized to implement various portions of the presently disclosed technology, including (but not limited to) methods 700 and/or 750. In FIG. 8, the computer system 800 includes one or more processors 805 and memory 810 connected via an interconnect 825. The interconnect 825 may represent any one or more separate physical buses, point to point connections, or both, connected by appropriate bridges, adapters, or controllers. The interconnect 825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 805 may include central processing units (CPUs) to control the overall operation of, for example, the host computer. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 810 can be or include the main memory of the computer system. The memory 810 represents any suitable form of random access memory (RAM), read-only memory (ROM), flash memory, or the like, or a combination of such devices. In use, the memory 810 may contain, among other things, a set of machine instructions which, when executed by processor 805, causes the processor 805 to perform operations to implement embodiments of the presently disclosed technology.

Also connected to the processor(s) 805 through the interconnect 825 is a (optional) network adapter 815. The network adapter 815 provides the computer system 800 with the ability to communicate with remote devices, such as the storage clients, and/or other storage servers, and may be, for example, an Ethernet adapter or Fiber Channel adapter.

Figure 9:
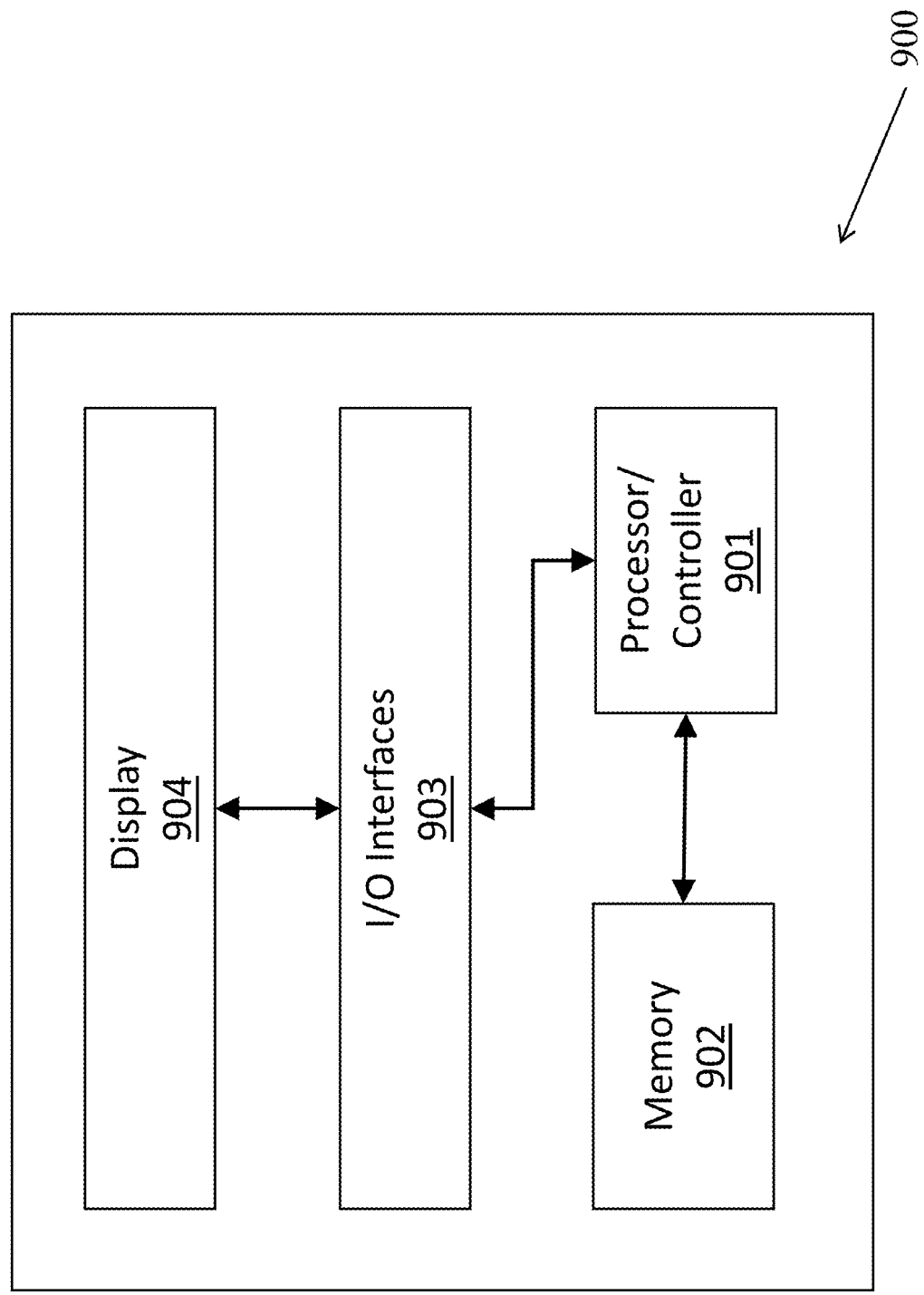
FIG. 9 shows a block diagram of an example embodiment of a device that can be utilized to implement various portions of the presently disclosed technology.

FIG. 9 shows a block diagram of an example embodiment of a mobile device 900 that can be utilized to implement various portions of the presently disclosed technology, including (but not limited to) methods 700 and/or 750. The mobile device 900 can be a laptop, a smartphone, a tablet, a camcorder, or other types of devices that are capable of processing videos. The mobile device 900 includes a processor or controller 901 to process data, and memory 902 in communication with the processor 901 to store and/or buffer data. For example, the processor 901 can include a central processing unit (CPU) or a microcontroller unit (MCU). In some implementations, the processor 901 can include a field-programmable gate-array (FPGA). In some implementations, the mobile device 900 includes or is in communication with a graphics processing unit (GPU), video processing unit (VPU) and/or wireless communications unit for various visual and/or communications data processing functions of the smartphone device. For example, the memory 902 can include and store processor-executable code, which when executed by the processor 901, configures the mobile device 900 to perform various operations, e.g., such as receiving information, commands, and/or data, processing information and data, and transmitting or providing processed information/data to another device, such as an actuator or external display.

To support various functions of the mobile device 900, the memory 902 can store information and data, such as instructions, software, values, images, and other data processed or referenced by the processor 901. For example, various types of Random Access Memory (RAM) devices, Read Only Memory (ROM) devices, Flash Memory devices, and other suitable storage media can be used to implement storage functions of the memory 902. In some implementations, the mobile device 900 includes an input/output (I/O) unit 903 to interface the processor 901 and/or memory 902 to other modules, units or devices. For example, the I/O unit 903 can interface the processor 901 and memory 902 with to utilize various types of wireless interfaces compatible with typical data communication standards, e.g., such as between the one or more computers in the cloud and the user device. In some implementations, the mobile device 900 can interface with other devices using a wired connection via the I/O unit 903. The mobile device 900 can also interface with other external interfaces, such as data storage, and/or visual or audio display devices 904, to retrieve and transfer data and information that can be processed by the processor, stored in the memory, or exhibited on an output unit of a display device 904 or an external device. For example, the display device 904 can display a video frame that includes a block (a CU, PU or TU) that applies the intra-block copy based on whether the block is encoded using a motion compensation algorithm, and in accordance with the disclosed technology.

In some embodiments, a video encoder apparatus or decoder apparatus may implement a method of sub-block based prediction as described herein is used for video encoding or decoding. The various features of the method may be similar to the above-described methods 700 or 750.

In some embodiments, the video encoding and/or decoding methods may be implemented using a decoding apparatus that is implemented on a hardware platform as described with respect to FIG. 8 and FIG. 9.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for a conversion between a current video block of a video and a bitstream of the video, that whether or not a first affine mode is allowed for the current video block and whether or not a second affine mode is allowed for the current video block are based on a same dimension constrain; and performing, based on the determining, the conversion between the current video block and the bitstream, wherein the first affine mode and the second affine mode are not allowed in response to either a height of the current video block or a width of the current video block being smaller than or equal to 8, and the bitstream omits an indication for the first affine mode and the second affine mode; and wherein in a case that indications for the first affine mode and the second affine mode are absent in the bitstream, the bitstream is parsed without the indications for the first affine mode and the second affine mode, and the current video block is generated without using an affine mode.

2. The method of claim 1, wherein in the first affine mode, motion information of control points of the current video block is derived at least based on an affine candidate of the current video block and without applying motion vector differences (MVD).

3. The method of claim 2, wherein the first affine mode is a merge affine mode, and the second affine mode is a non-merge affine mode.

4. The method of claim 2, wherein the first affine mode is a direct affine mode, and the second affine mode is a non-direct affine mode.

5. The method of claim 1, wherein the first affine mode and the second affine mode are not allowed in response to the height and the width of the current video block being both smaller than or equal to 8.

6. The method of claim 1, wherein the conversion includes encoding the current video block into the bitstream.

7. The method of claim 1, wherein the conversion includes decoding the current video block from the bitstream.

8. An apparatus for processing video data comprising a processor and a non-transitory memory with instructions thereon, wherein the instructions upon execution by the processor, cause the processor to:

make a determination, for a conversion between a current video block of a video and a bitstream of the video, that whether or not a first affine mode is allowed for the current video block and whether or not a second affine mode is allowed for the current video block are based on a same dimension constrain; and perform, based on the determination, the conversion between the current video block and the bitstream, wherein the first affine mode and the second affine mode are not allowed in response to either a height of the current video block or a width of the current video block being smaller than or equal to 8, and the bitstream omits an indication for the first affine mode and the second affine mode; and wherein in a case that indications for the first affine mode and the second affine mode are absent in the bitstream, the bitstream is parsed without the indications for the first affine mode and the second affine mode, and the current video block is generated without using an affine mode.

9. The apparatus of claim 8, wherein in the first affine mode, motion information of control points of the current video block is derived at least based on an affine candidate of the current video block and without applying motion vector differences (MVD).

10. The apparatus of claim 9, wherein the first affine mode is a merge affine mode, and the second affine mode is a non-merge affine mode.

11. The apparatus of claim 9, wherein the first affine mode is a direct affine mode, and the second affine mode is a non-direct affine mode.

12. The apparatus of claim 8, wherein the first affine mode and the second affine mode are not allowed in response to the height and the width of the current video block being both smaller than or equal to 8.

13. A non-transitory computer-readable storage medium storing instructions that cause a processor to:

determine, for a conversion between a current video block of a video and a bitstream of the video, that whether or not a first affine mode is allowed for the current video block and whether or not a second affine mode is allowed for the current video block are based on a same dimension constrain; and perform, based on the determine, the conversion between the current video block and the bitstream, wherein the first affine mode and the second affine mode are not allowed in response to either a height of the current video block or a width of the current video block being smaller than or equal to 8, and the bitstream omits an indication for the first affine mode and the second affine mode; and wherein in a case that indications for the first affine mode and the second affine mode are absent in the bitstream, the bitstream is parsed without the indications for the first affine mode and the second affine mode, and the current video block is generated without using an affine mode.

14. The non-transitory computer-readable storage medium of claim 13, wherein in the first affine mode, motion information of control points of the current video block is derived at least based on an affine candidate of the current video block and without applying motion vector differences (MVD).

15. The non-transitory computer-readable storage medium of claim 14, wherein the first affine mode is a merge affine mode, and the second affine mode is a non-merge affine mode.

16. The non-transitory computer-readable storage medium of claim 14, wherein the first affine mode is a direct affine mode, and the second affine mode is a non-direct affine mode.

17. A non-transitory computer-readable recording medium storing a bitstream which is generated by a method performed by a video processing apparatus, wherein the method comprises:

determining, for a conversion between a current video block of a video and the bitstream of the video, that whether or not a first affine mode is allowed for the current video block and whether or not a second affine mode is allowed for the current video block are based on a same dimension constrain; and generating the bitstream based on the determining, wherein the first affine mode and the second affine mode are not allowed in response to either a height of the current video block or a width of the current video block being smaller than or equal to 8, and the bitstream omits an indication for the first affine mode and the second affine mode; and wherein in a case that indications for the first affine mode and the second affine mode are absent in the bitstream, the bitstream is parsed without the indications for the first affine mode and the second affine mode, and the current video block is generated without using an affine mode.

18. The non-transitory computer-readable recording medium of claim 17, wherein in the first affine mode, motion information of control points of the current video block is derived at least based on an affine candidate of the current video block and without applying motion vector differences (MVD).

19. The non-transitory computer-readable recording medium of claim 18, wherein the first affine mode is a merge affine mode, and the second affine mode is a non-merge affine mode.

20. The non-transitory computer-readable recording medium of claim 18, wherein the first affine mode is a direct affine mode, and the second affine mode is a non-direct affine mode.

* * * * *